(12) United States Patent
Jokschas et al.

(10) Patent No.: US 10,202,952 B2
(45) Date of Patent: Feb. 12, 2019

(54) EXCHANGEABLE FILTER OF A FILTER DEVICE FOR FLUID, FILTER DEVICE, AND FILTER HEAD OF A FILTER DEVICE

(71) Applicant: Mann+Hummel GMBH, Ludwigsburg (DE)

(72) Inventors: Guenter Jokschas, Murrhardt (DE); Stephan Niemeyer, Steinheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 470 days.

(21) Appl. No.: 14/988,581

(22) Filed: Jan. 5, 2016

(65) Prior Publication Data

US 2016/0201625 A1 Jul. 14, 2016

(30) Foreign Application Priority Data

Jan. 12, 2015 (DE) ......................... 10 2015 000 070

(51) Int. Cl.
*B01D 27/08* (2006.01)
*B01D 35/00* (2006.01)
(Continued)

(52) U.S. Cl.
CPC ............ *F02M 37/22* (2013.01); *B01D 27/08* (2013.01); *B01D 35/005* (2013.01); *B01D 35/30* (2013.01);
(Continued)

(58) Field of Classification Search
CPC .. F02M 37/22; F01M 11/03; F01M 2011/031; B01D 35/005; B01D 35/306;
(Continued)

(56) References Cited

U.S. PATENT DOCUMENTS

| 4,743,374 A | * | 5/1988 | Stifelman | B01D 27/08 210/440 |
| 5,395,509 A | * | 3/1995 | Guerra Cisneros | B01D 35/30 210/232 |

(Continued)

FOREIGN PATENT DOCUMENTS

| EP | 0830885 A1 | 3/1998 |
| EP | 2002875 A1 | 12/2008 |

(Continued)

*Primary Examiner* — David C Mellon
(74) *Attorney, Agent, or Firm* — James Hasselbeck

(57) ABSTRACT

An exchangeable filter has a filter housing, a filter element, and a connecting member arranged at a filter housing end face. A filter-associated connecting part of a connecting device detachably connects the exchangeable filter with a filter head of a filter device by a plug-in/rotary movement. A filter-associated locking part of a locking device locks the connecting device in a locked state automatically and releasably by the plug-in/rotary movement with a head-associated locking part of the locking device provided at the filter head. The filter-associated locking part has a latching section latching with a head-associated latching section of the head-associated locking part. The filter-associated locking part has a support section on a side of the filter-associated locking part facing away radially from the filter-associated latching section. The support section radially supports the filter-associated locking part relative to the circumferential section of the filter housing in the locked state.

12 Claims, 5 Drawing Sheets

(51) Int. Cl.
   *B01D 35/30* (2006.01)
   *F02M 37/22* (2006.01)

(52) U.S. Cl.
   CPC ...... *B01D 35/306* (2013.01); *B01D 2201/305* (2013.01); *B01D 2201/4015* (2013.01)

(58) Field of Classification Search
   CPC .............................. B01D 35/30; B01D 27/08; B01D 2201/4015; B01D 2201/305; B01D 2201/4092; B01D 2201/4076; B01D 2201/4061; B01D 2201/4046
   See application file for complete search history.

(56) References Cited

U.S. PATENT DOCUMENTS

| | | | | |
|---|---|---|---|---|
| 5,947,462 A * | 9/1999 | Roussel | ................ | B01D 35/30 210/232 |
| 6,158,592 A * | 12/2000 | Reinhart | ................ | B01D 27/08 210/443 |
| 6,716,348 B1 * | 4/2004 | Morgan | ................ | B01D 29/27 210/232 |
| 6,966,986 B1 * | 11/2005 | Lackey | ................ | B01D 35/153 210/234 |
| 8,562,831 B2 * | 10/2013 | Bors | ................ | B01D 35/306 210/232 |
| 9,776,116 B2 * | 10/2017 | Honermann | ......... | B01D 29/232 |
| 2002/0121519 A1 * | 9/2002 | Martin | ................ | B01D 29/96 220/296 |
| 2003/0196947 A1 * | 10/2003 | Gundrum | ............ | B01D 29/11 210/232 |
| 2009/0008317 A1 * | 1/2009 | Mules | ................ | B01D 27/08 210/233 |
| 2011/0036766 A1 * | 2/2011 | Monzie | ................ | B01D 27/106 210/236 |
| 2014/0263099 A1 * | 9/2014 | Patera | ................ | B01D 35/147 210/767 |
| 2015/0190742 A1 * | 7/2015 | Jensen | ................ | B01D 27/08 210/236 |
| 2016/0038861 A1 * | 2/2016 | Wildermuth | ......... | B01D 35/153 210/232 |
| 2016/0144297 A1 | 5/2016 | Jokschas et al. | | |
| 2018/0085689 A1 * | 3/2018 | Vercammen | ........... | B01D 29/96 |

FOREIGN PATENT DOCUMENTS

| | | | | |
|---|---|---|---|---|
| EP | | 2108424 A1 | 10/2009 | |
| WO | WO-2014018825 A1 * | | 1/2014 | ............ B01D 27/08 |

* cited by examiner

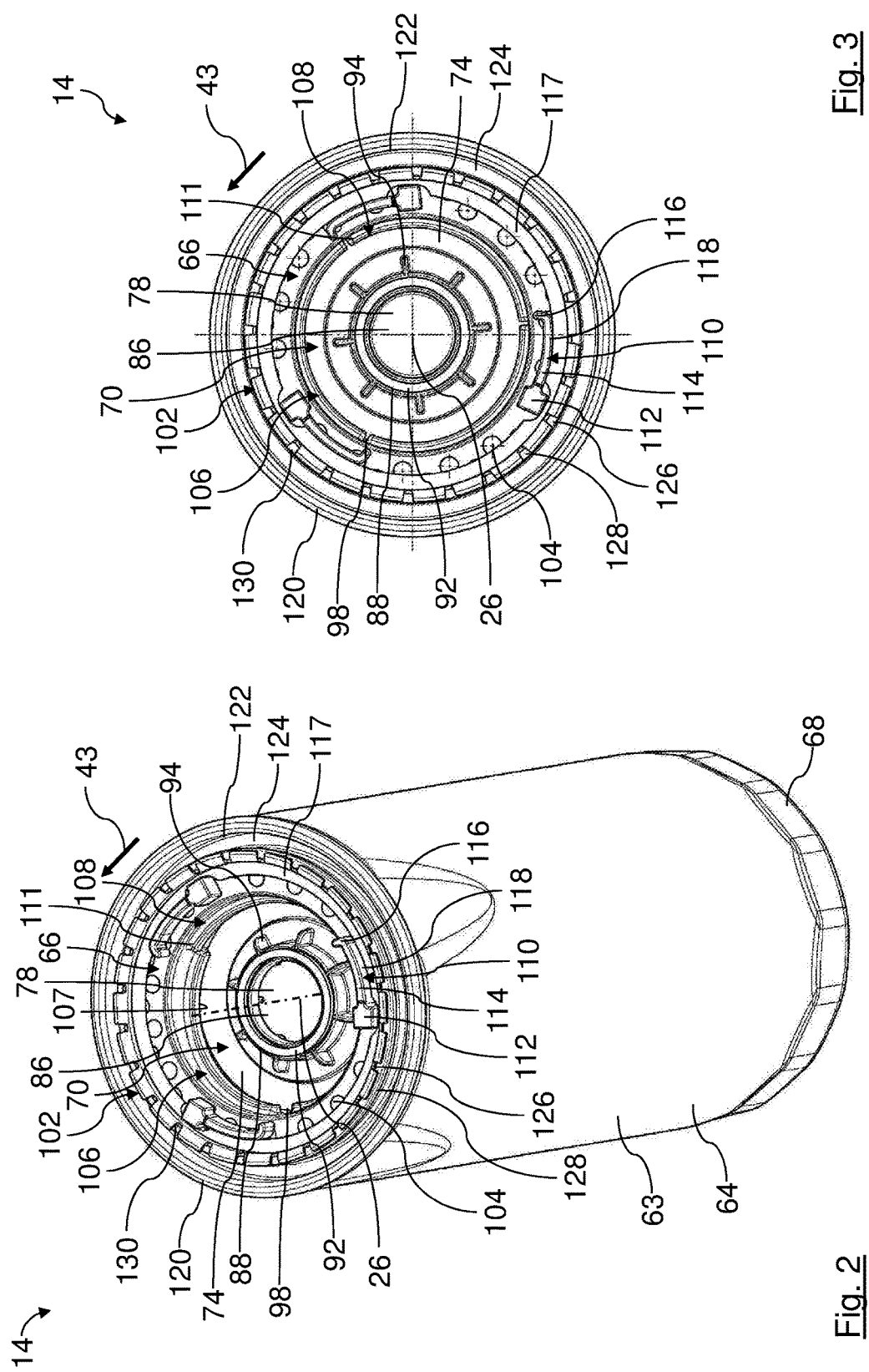

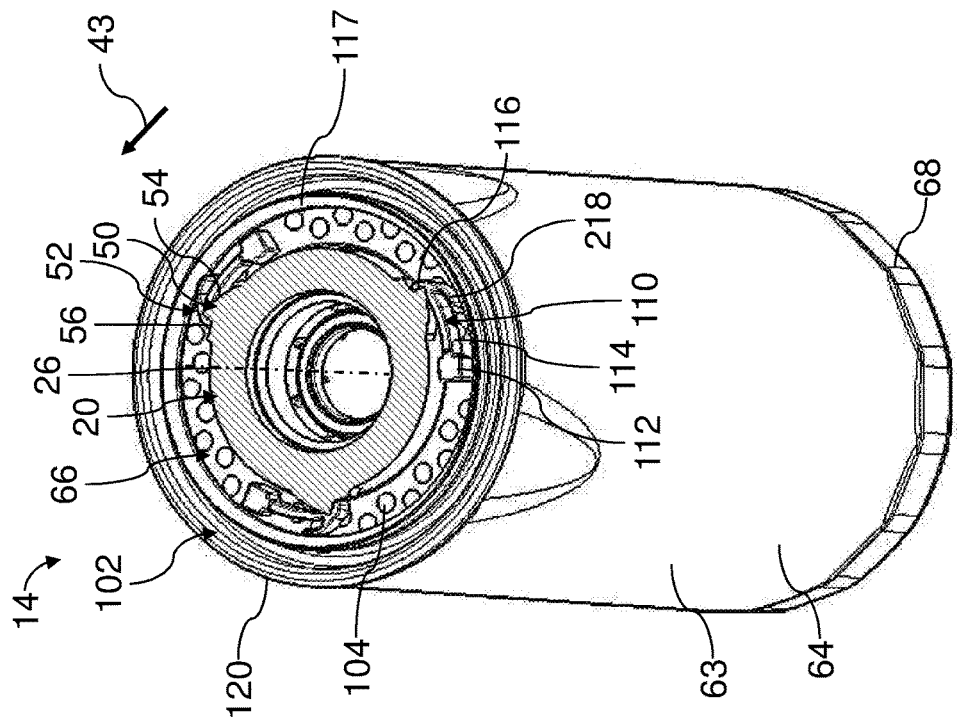
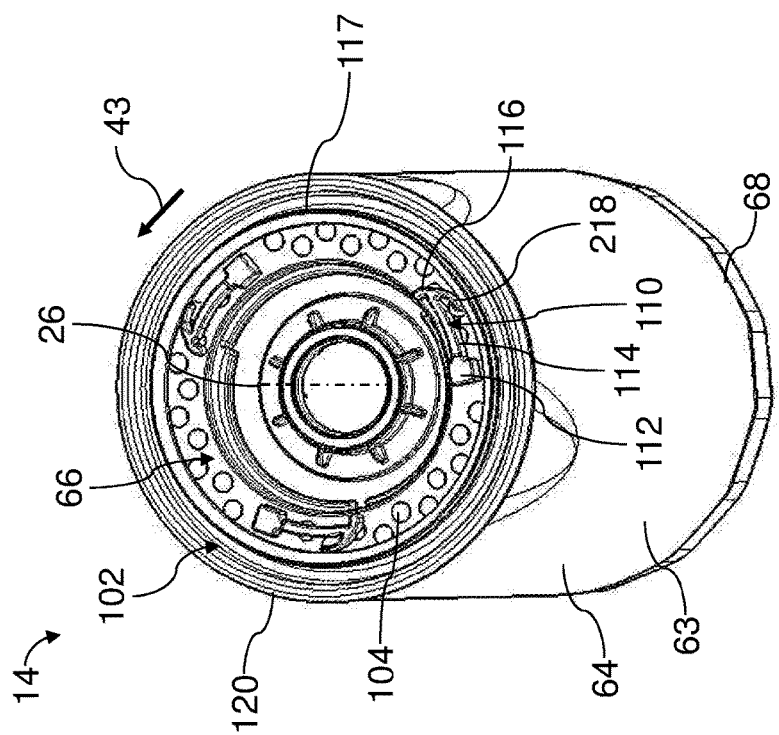
Fig. 5
Fig. 4

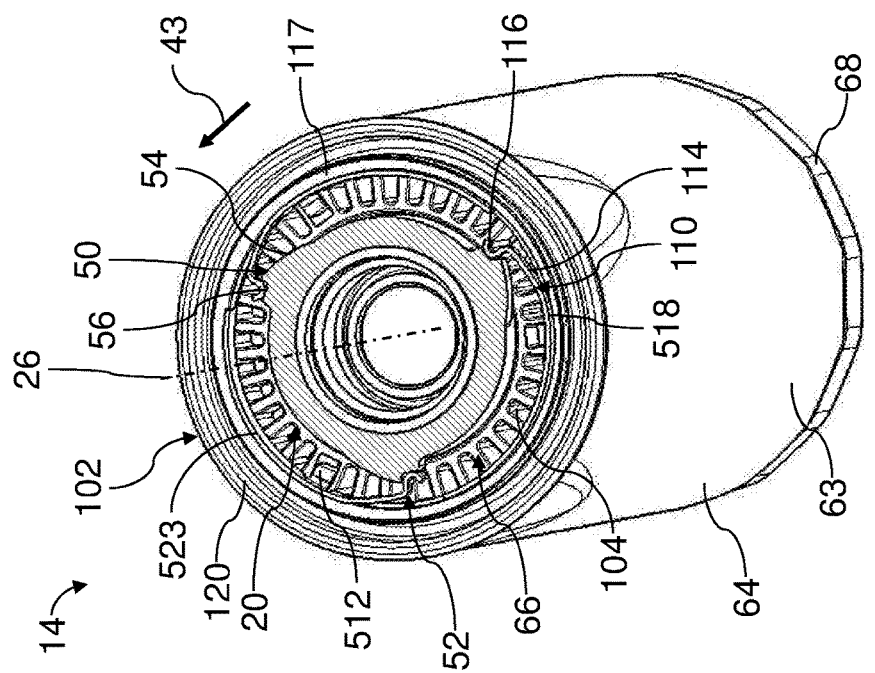
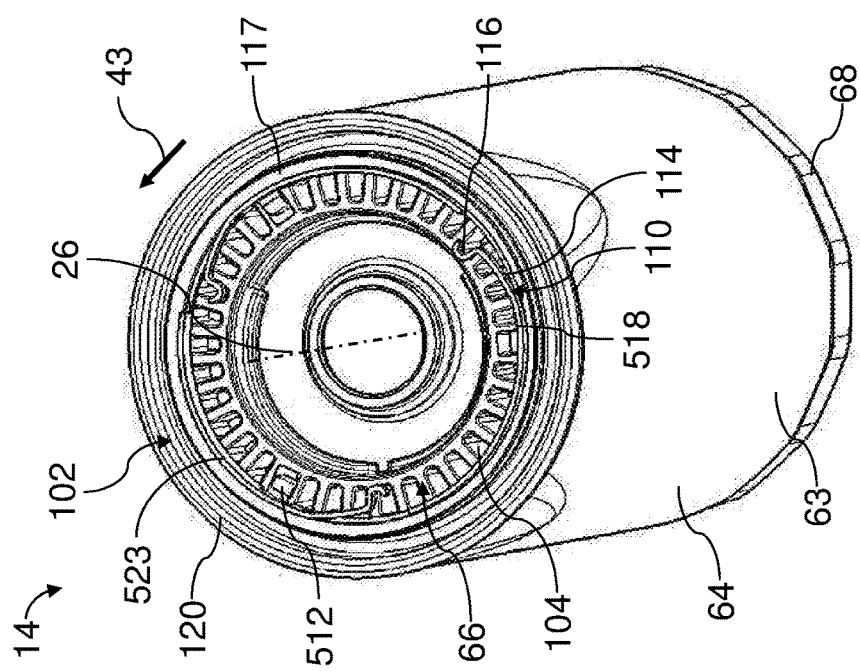

EXCHANGEABLE FILTER OF A FILTER DEVICE FOR FLUID, FILTER DEVICE, AND FILTER HEAD OF A FILTER DEVICE

BACKGROUND OF THE INVENTION

The invention concerns an exchangeable filter, in particular spin-on filter, of a filter device for fluid, in particular liquid, in particular oil or fuel, in particular of an internal combustion engine, in particular of a motor vehicle.

Moreover, the invention concerns a filter device for fluid, in particular liquid, in particular oil or fuel, in particular of an internal combustion engine, in particular of a motor vehicle.

Furthermore, the invention concerns a filter head of a filter device, in particular of a filter device according to the invention, for fluid, in particular liquid, in particular oil or fuel, in particular of an internal combustion engine, in particular of a motor vehicle, for connection of at least one exchangeable filter, in particular of an exchangeable filter according to the invention, in particular of a spin-on filter.

EP 0 830 885 A1 discloses a filter device with a filter head and a filter cartridge. The filter cartridge is fastened to the filter head. The filter head comprises a plurality of outwardly oriented, ascending projections which form a first component of a bayonet-type connection. The ascending projections are interacting with similar projections of the filter cartridge for attachment of the filter cartridge to the filter head.

SUMMARY OF THE INVENTION

The invention has the object to design an exchangeable filter, a filter device, and a filter head of the aforementioned kind in such a way that an attachment of the exchangeable filter on the filter head is improved, in particular can be realized more easily and/or more reliably. Also, stability of the connection of the exchangeable filter with the filter head is to be improved. Moreover, the risk of uncontrolled separation of the connection of the exchangeable filter with the filter head should be reduced.

The object is solved according to the invention in that the exchangeable filter head comprises:

a filter housing, in particular a housing cup, in which at least one filter element is arranged or can be arranged,
a connecting member which is arranged at the end face of the filter housing and is provided with at least one fluid opening, in particular with at least one eccentric fluid opening and with a centrally arranged central opening,
a filter-associated connecting part of a connecting device for detachably connecting the exchangeable filter with a filter head of the filter device,
at least one filter-associated locking part of at least one locking device for releasably locking the connecting device, wherein the filter-associated connecting part is detachably connectable with the filter head by means of a plug-in/rotary movement relative to a connecting axis, wherein the at least one filter-associated locking part automatically is releasably lockable by means of the plug-in/rotary movement with an appropriate head-associated locking part of the locking device, and wherein at least one filter-associated locking part comprises at least one filter-associated latching section of a latching connection for latching with a head-associated latching section of a head-associated locking part of the at least one locking device in a locked state and comprises at least one support section on the side of the filter-associated locking part that is facing away, radially relative to the connecting axis, from the at least one filter-associated latching section for supporting the at least one filter-associated locking part relative to at least one housing-associated circumferential section at least in radial direction at least in the locked state.

The exchangeable filter can also be designed or referred to as a spin-on filter. In the exchangeable filter, at least one filter element is arranged in the housing cup of the filter housing, or can be arranged therein. The exchangeable filter can be exchanged complete with the filter housing and with the at least one filter element that is arranged therein. Advantageously, the at least one filter element can be arranged fixedly or exchangeably in the filter housing. The filter housing can be opened non-destructively or can be opened destructively.

When in the following "radial", "axial", "circumferential", "tangential" or the like is mentioned, then this relates to the connecting axis, if not described otherwise.

According to the invention, at least one filter-associated locking part, in the closing position of the connecting device, can interact with at least one head-associated locking part to produce a releasable connection. Closing and/or opening of the detachable connection can advantageously be possible without use of separate tools. Locking and releasing of the locking device is realized automatically upon connecting the exchangeable filter with the filter head. The locking device serves as an anti-rotation device. The locking parts secure the exchangeable filter in operation and secure it against uncontrolled separation, in particular against becoming unscrewed. By means of the locking device, an opening force, in particular an opening torque, for releasing the connection of the exchangeable filter with the filter head can be increased. In this way, the closed connecting device can be mechanically secured at least in its closed state. Accordingly, safe operation of the exchangeable filter can be ensured.

With the at least one filter-associated latching section, the filter-associated locking part can latch with an appropriate, in particular complementary, head-associated latching section of the corresponding head-associated locking part. In relation to an opening rotational direction of the exchangeable filter relative to the filter head, the latching sections can engage each other mutually upon latching. In order to overcome the latching action for opening the connecting device, an increased opening torque must be applied.

According to the invention, by means of the at least one support section a stability of the locking device in the locking position can be improved. The opening force, in particular opening torque, for releasing the connection of the exchangeable filter with the filter head can thus be further increased. Moreover, particularly manual mounting of the exchangeable filter can be simplified.

Advantageously, at least one support section can be supported indirectly or directly on the housing, in particular on the housing cup, on a cover, in particular a cover ring, and/or the connecting member.

Advantageously, at least one part of a locking device can be part of the connecting device or vice versa.

The locking device, in particular latching connection, can advantageously generate upon locking in particular an acoustically and/or tactually detectable signal. In this way, the closing state of the connecting device can be simply recognized.

In an advantageous embodiment, the at least one support section can project past the other sections of the filter-associated locking part at least in the locking position of the locking device at the support side, in particular radially outwardly or radially inwardly, radial relative to the connecting axis. In this way, the at least one support section can support the at least one locking part simply and in a controlled fashion against the housing-associated circumferential section. The housing-associated circumferential section can be arranged radially outside of the at least one filter-associated locking part. In this case, the support side is located on the radial outer circumferential side of the filter-associated locking part. Alternatively, at least one support section can be designed such that it is supported radially inwardly on a corresponding housing-associated radial inner circumferential section.

In a further advantageous embodiment, at least one support section can be elastic, in particular spring-elastic, at least in radial direction relative to the connecting axis. In this way, it can simply yield correspondingly in radial direction upon locking or releasing of the locking device.

In a further advantageous embodiment, at least one support section can be arranged on and/or engage the side of the corresponding filter-associated locking part which is approximately oppositely positioned to the at least one filter-associated latching section in radial direction relative to the connecting axis and/or at least one support section can be arranged in a displaced position relative to at least one filter-associated latching section of the corresponding filter-associated locking part.

In case of oppositely positioned filter-associated latching sections and support sections, elastic radial forces, which can be realized by the at least one filter-associated latching section and the at least one support section, can interact better. In this way, the locking action can be improved.

Between support sections and filter-associated latching sections that are displaced relative to each other, elastic sections, in particular arm sections, of the filter-associated locking part can be realized additionally. As a whole, by selecting the arrangement of the at least one filter-associated latching section and the at least one support section, an opening characteristic and/or a closing characteristic of the connection of the exchangeable filter with the filter head can be influenced In a further advantageous embodiment, at least one support section can be realized as a projection, in particular a support arm. The projection can advantageously extend from the filter-associated locking part at a slant opposite to the closing rotational direction of the exchangeable filter. In this way, a closing force, in particular a closing torque, upon connecting the exchangeable filter with the filter head can be reduced in relation to an opening force, in particular an opening torque, for separating the exchangeable filter from the filter head.

In a further advantageous embodiment, at least one intermediate element, in particular an intermediate ring, can be provided that, relative to the connecting axis, can be arranged radially between at least one support section and a housing-associated circumferential section, in particular a circumferential section of a housing cover and/or of the connecting member.

The at least one support section can be radially supported on the at least one intermediate element. The at least one intermediate element, in turn, can be supported with its side, which is radially facing away from the at least one support section, particularly on a circumferential side of the filter housing, of a cover, or of a cover part of the filter housing and/or on the connecting member. Advantageously, at least one intermediate element can fulfill additionally a further function, in particular a sealing function.

In a further advantageous embodiment, at least one intermediate element can be elastic or rigid. By appropriate predetermination of the elasticity of the at least one intermediate element, a closing characteristic and/or an opening characteristic of the connection of the exchangeable filter with the filter head can be further influenced.

In a further advantageous embodiment, at least one filter-associated locking part can be at least partially elastic at least in radial direction relative to the connecting axis. In this manner, the at least one filter-associated locking part upon a locking process or releasing process can be bent radially outwardly or radially inwardly and can yield in this way. In this context, the at least one filter-associated locking part can be bent by means of at least one appropriate head-associated locking part. The head-associated locking part can be provided in a matching arrangement radially outwardly or radially inwardly with an appropriate circumferential contact surface. The elasticity enables a return of the at least one filter-associated locking part into its initial state. In a locking position of the locking device, the at least one filter-associated locking part can effect by means of a mechanical pretension, generated by deforming, in particular bending, a radial counter holding force against a corresponding head-associated locking part. By means of the radial counter holding force, the required opening force, in particular an opening torque, for opening the connection can be increased. Accordingly, the at least one filter-associated locking part can be held in its locking position relative to the at least one head-associated locking part.

Advantageously, at least one filter-associated locking part can be resistant relative to high operating temperatures, in particular temperatures of 200° C. and more. In this way, the operational safety of the exchangeable filter, in particular of the locking action, can be ensured even at correspondingly high operating temperatures.

Advantageously, at least one filter-associated locking part can be comprised of elastic material, in particular metal and/or plastic, or can comprise such a material. Metal can exhibit a high temperature resistance. By means of a locking part of metal, the operational safety of the exchangeable filter can thus be improved even at high operating temperatures. Moreover, by use of metal, fatigue of the at least one filter-associated locking part can be reduced. Accordingly, the service life can be increased. Moreover, the at least one locking part can also be reused. Locking parts made of or comprising plastic material can be realized in a simple and inexpensive way.

Advantageously, at least one filter-associated locking part can comprise sheet metal, spring steel, sheet steel with deep drawing properties, or another elastic metal, or can be comprised thereof.

Advantageously, at least one locking part can be a single piece or a multi-piece configuration. At least one latching section, at least one support section, and optionally at least one arm section and/or a profiling of at least one locking part can be a single piece or a multi-piece configuration.

At least one in particular elastic filter-associated locking part can be exchanged simply together with the exchangeable filter. Accordingly, fatigue effects of the in particular elastic and/or movable filter-associated locking part, which may occur due to multiple opening and closing actions of the connecting device and corresponding locking and releasing of the locking device, can be avoided. The head-associated locking part can advantageously be designed such that it has an appropriately long service life.

Advantageously, at least one filter-associated locking part, relative to the connecting axis, can be inflexible at least in circumferential direction, in particular in circumferential direction and in axial direction, in comparison to its flexibility in radial direction. The at least one filter-associated locking part can be pull-resistant and/or pressure-resistant relative to the filter head in rotational direction of the housing cup about the connecting axis. Accordingly, with the at least one filter-associated locking part tangential forces, in particular tensile forces or pressure forces, can be transmitted from the appropriate head-associated locking part onto the exchangeable filter, in particular the filter housing. Accordingly, when the locking device is locked, it can prevent that the connecting device can separate by uncontrolled rotation of the exchangeable filter relative to the filter head in opening rotational direction. In combination with the in particular elastic radial counter holding force of the at least one filter-associated locking part on the at least one head-associated locking part, an appropriately large leverage force can result. By means of the leverage force, the stability of the locking action can be improved.

Moreover, in particular operation-related loads on the at least one filter-associated locking part in circumferential direction relative to the connecting axis can be compensated better. Such operation-related loads can be caused in particular by vibrations and/or pressure differences and/or temperature differences.

In addition, the at least one filter-associated locking part can be comparatively inflexible in axial direction. In this way, it can be prevented that the at least one filter-associated locking part upon attachment, upon removal, or in operation of the exchangeable filter can deform, in particular bend, in axial direction relative to the connecting axis.

Advantageously, at least one filter-associated locking part can be connected indirectly, in particular by means of the connecting member and/or a cover or a cover ring, with the filter housing, in particular the housing cup.

The at least one filter-associated connecting part can advantageously be arranged on the side of the filter housing, in particular of the connecting member, that is facing the filter cup.

The detachable connection can be located advantageously outside of an interior of the exchangeable filter. Advantageously, it can be located on the exterior side of the connecting member, in particular a cover, of the exchangeable filter. It can be visible from the exterior when the exchangeable filter is separated from the filter head. Accordingly, prior to mounting of the exchangeable filter, it can be recognized whether the at least one filter-associated locking part is functional, in particular undamaged.

At least one filter-associated locking part can advantageously project past the connecting member in axial direction.

Advantageously, at least one filter-associated locking part can be arranged on at least one separate fastening element, in particular a cover or (sheet metal) cover ring. The at least one separate fastening element can advantageously be connected with the filter housing, in particular the connecting member and/or the filter head. Advantageously, at least one separate fastening element can be connected by form fit and/or by material fusion and/or by frictional connection with the filter housing, in particular the connecting member and/or the filter head. At least one separate fastening element can advantageously be connected by means of a crimp connection with the filter cup.

Advantageously, the locking device may comprise one or several, in particular three, filter-associated locking parts.

Advantageously, the number, the arrangement, and the distribution of the filter-associated locking parts can correspond to that of the head-associated locking parts. In this way, each filter-associated locking part can interact in matched arrangement with an appropriate head-associated locking part.

Advantageously, several filter-associated locking parts can be distributed circumferentially, in particular uniformly, relative to the connecting axis.

Advantageously, several locking parts can be arranged symmetrically relative to the connecting axis. In this way, an attachment of the exchangeable filter on the filter head can be simplified. Three filter-associated locking parts and corresponding head-associated locking parts can be simply arranged symmetrically. Moreover, three pairs of locking parts enable a uniform force transmission between the exchangeable filter and the filter head.

In a further advantageous embodiment, at least one filter-associated locking part separately and/or at least two filter-associated locking parts interconnectedly, in particular interconnected as a single piece, can be connected indirectly or directly with the filter housing, in particular the connecting member and/or a cover or cover part.

Separate locking parts can be produced and mounted independently from one another. The locking parts can be provided in a simple way also with different properties, in particular configurations and/or materials, and/or arranged at different locations. Moreover, forces can be transmitted independent from each other with the separate locking parts. The type of attachment of the separate locking parts with the filter housing can be identical, similar, or different.

Several interconnected locking parts can be produced and/or assembled jointly. In this way, the mounting expenditure can be simplified.

Advantageously, at least one filter-associated locking part or several interconnected locking parts can be connected indirectly or directly with the filter housing by means of material fusion and/or by form fit and/or by frictional connection, in particular matching fit configurations, plug connections, adhesive connections, welded connections, soldered connections, shape-fit connections, clamping connections, press-fit connections, latch connections, rotary/plug-in connections, in particular screw connections and/or bayonet-type connections, or the like, or combinations of several connecting types.

Advantageously, at least one locking part can be connected so as to from one piece or as a multi-piece configuration indirectly or directly with the filter housing.

Advantageously, at least one locking part can be realized as a multi-component module, in particular two-component module, with a housing-associated part, in particular the connecting member and/or a housing cover.

Advantageously, at least one locking part can be integrated by means of a plastic forming method, in particular a plastic injection process, on a housing-associated part, in particular the connecting member and/or a housing cover.

Advantageously, at least one filter-associated locking part can have at least one holding section with which it can be connected with the housing-associated part, in particular the connecting member.

Advantageously, at least one holding section of the at least one filter-associated locking part, viewed axially relative to the connecting axis, can at least partially overlap with the connecting member, the housing cover, and/or the filter housing, in particular the housing cup. In this way, a lever arm in axial direction can be shortened. An axial load on the filter-associated connecting part, in particular the holding section, can be reduced. Advantageously, the at least one filter-associated locking part, in particular the holding section, can be pressed or plugged at least partially into the connecting member, the housing cover and/or the housing cup.

At least one holding section can have at least one plug section or tab section that can be plugged or pressed into an appropriate insertion opening, in particular a fluid opening that is present anyway, of the housing-associated part, in particular of the connecting member and/or the housing cover.

Alternatively or additionally, the at least one holding section can comprise at least one insertion opening for an appropriate housing-associated plug section or tab section. At least one plug-in section/tab section and/or at least one insertion opening can be round, oval, and/or angular. The plug section/tab section and the corresponding insertion opening can have the same shape or different shapes. At least one insertion opening and/or at least one corresponding plug section/tab section can be of rotational symmetry, in particular round. In this way, the plug section/tab section can be arranged in different rotational positions in the insertion opening. Alternatively or additionally, at least one insertion opening and the corresponding plug section/tab section can be provided with asymmetries relative to a rotation, in particular can be oval or angular. In this way, the plug section/tab section can be arranged only in appropriately provided preferred positions in the insertion opening, in particular in a rotationally fixed position.

In a further advantageous embodiment, at least one filter-associated locking part can comprise at least one in particular elastically movable, in particular deformable, filter-associated latching section, in particular a latching nose, a hook section, or a latching receptacle.

The appropriate head-associated locking part can comprise an appropriate, in particular complementary, head-associated latching section, in particular a latching receptacle, a latching nose, or a hook section. The at least one head-associated latching section can be elastic or rigid. The locking device releases in that at least the filter-associated locking part, in particular the at least one filter-associated latching section, can yield elastically against its elastic pretension force. In this way, the locking device can be locked in an easily releasable manner.

Latching receptacles, in particular latching depressions, can advantageously be simply realized on the head-associated locking part. Latching receptacles can be realized as immobile components and have a reduced wear and reduced fatigue in comparison to movable components. Therefore, correspondingly long service lives can be realized with immobile components.

At least one filter-associated latching section of at least one filter-associated locking part can advantageously be comparatively inflexible in circumferential direction relative to the connecting axis. In this way, it can absorb appropriate tensile loads and/or pressure loads in circumferential direction, in particular tangential direction.

At least one of the filter-associated locking parts can advantageously comprise an elastic arm section, in particular a spring arm or spring arm section. An arm section is an elongate, substantially freely extending section. The arm section can advantageously be elastically, in particular spring-elastically, bent relative to the connecting axis in radial direction outwardly and/or inwardly.

At least one filter-associated latching section can be advantageously arranged at a free end of the arm section.

Advantageously, the arm section can extend from a housing-associated fastening location, in particular a holding section of the at least one locking part, in the closing rotation direction of the connecting device. In this way, the arm section in opening rotation direction of the locking device can be loaded by tension. In the opening rotation direction, the mechanical load on the locking parts is greater than in the closing rotation direction. An arm section which is loaded by tension is loadable with greater mechanical forces than an arm section loaded by pressure. The arm section and thus the corresponding filter-associated locking parts can be designed and sized accordingly more simply, in particular smaller.

In a further advantageous embodiment, at least one filter-associated locking part can be provided with at least one profiling, in particular with crimps and/or bends.

With at least one profiling, the stability and/or elasticity/flexibility of the at least one filter-associated locking part can be influenced and adjusted. Accordingly, elastic, in particular springy, properties as well as blocking properties can be improved, respectively. The elastic properties can be required for mounting and demounting the exchangeable filter in order to lock or release the locking action. The blocking properties can be required in operation of the exchangeable filter in order to prevent unwanted opening of the connection and/or to compensate operating-relevant forces. Moreover, a force transmission can be improved by means of the profiling. In this way, even greater forces can be absorbed.

The at least one profiling can be realized by bending corresponding sections, in particular arm sections and/or support sections, of the filter-associated locking part. With the bends, grooves and/or raised portions can be realized.

Advantageously, the at least one profiling can be located in a plane perpendicular to the connecting axis. In this way, the radial elasticity of the at least one locking part and/or its reduced flexibility in circumferential direction can be influenced respectively, in particular improved.

Advantageously, at least one profiling can be located between a holding section with which the locking part is connected to the housing and a filter-associated latching section. Additionally or alternatively, the at least one profiling can be located between a filter-associated support section and a filter-associated latching section. Additionally or alternatively, at least one profiling can be located between a filter-associated support section and a holding section. At least one profiling can also be located within at least one holding section, at least one support section, at least one latching section, and/or at least one arm section, or can be at least partially formed thereby.

Advantageously, at least one filter-associated connecting part can be arranged at a fluid opening, in particular the centrally arranged center opening.

Advantageously, the filter-associated connecting part can comprise several filter-associated connecting webs. The connecting webs can be distributed in circumferential direction of the connecting axis of at least one fluid opening, in particular the central opening. The connecting webs can be projecting radially inwardly.

Advantageously, the number of the filter-associated connecting webs can match the number of filter-associated locking parts. The filter-associated connecting webs and the filter-associated locking parts can be respectively assigned relative to each other.

The connecting webs can be realized as ramp sections.

Advantageously, the connecting webs can be continuous in circumferential direction relative to the connecting axis. The connecting webs can comprise also interruptions in circumferential direction relative to the connecting axis.

At least one eccentric fluid opening can advantageously be a fluid inlet opening. The fluid can flow through the fluid inlet opening into an interior of the exchangeable filter.

The connecting member can advantageously be or comprise a connecting plate and/or a cover ring, in particular a sheet metal cover ring.

The head-associated connecting part can advantageously be designed as a connecting socket. The head-associated connecting part can alternatively also comprise a section that has the function and/or shape of a connecting socket.

Advantageously, the connecting device can comprise at least one inner seal that is extending circumferentially relative to the connecting axis.

Advantageously, the inner seal relative to the connecting axis can be arranged, axially opposite the filter-associated connecting part, so as to be displaced toward the interior of the exchangeable filter.

The inner seal can advantageously contribute to an axial clamping action of the connecting device. In this way, vibrations between the exchangeable filter and the filter head can be dampened. A possible noise development, in particular rattling, can thus be reduced.

The inner seal can moreover also act as a protection against unscrewing. After compression of the inner seal a rotation of the exchangeable filter relative to the filter head can be made difficult in a direction opposite to the closing rotation direction as a result of friction. Accordingly, the probability can be reduced that the connecting device can separate in an uncontrolled fashion.

The connecting device can advantageously be provided with at least one outer seal extending circumferentially relative to the connecting axis.

The exchangeable filter can advantageously comprise a round cross-section. The exchangeable filter can advantageously be coaxial to a filter axis. The filter axis can advantageously coincide with the connecting axis. The exchangeable filter can advantageously comprise at least one filter element. The at least one filter element can advantageously comprise a circumferentially closed filter medium. The filter medium can advantageously be folded in a star shape or zigzag shape. The filter medium can advantageously be seal-tightly connected on at least one end face with an end member, in particular an end disk. The filter element can advantageously be coaxial to the filter axis. The filter element can advantageously comprise a support member. The support member can advantageously comprise a central tube. The central tube can advantageously be located in an element interior of the filter element. The central tube can extend between the end members.

Advantageously, the filter-associated connecting part can be embodied with a cover part, in particular the connecting member, for closing the housing of the exchangeable filter. The filter-associated connecting part can advantageously be connected with the cover part to form one piece. In this way, an expenditure regarding components can be reduced. The cover part can advantageously comprise at least one passage, in particular an inlet and/or an outlet, for the fluid into the exchangeable filter or out of it. The cover part can advantageously be secured by means of a fixation element on a further housing part, in particular the filter cup, of the exchangeable filter. The fixation element can advantageously comprise a sheet metal ring which is connectable to the further housing part. The sheet metal ring can advantageously be connected by means of a crimp connection with the further housing part.

Advantageously, the connecting device can be located between a raw side and a clean side of a filter element of the exchangeable filter. The connecting device can thus be arranged advantageously within an outer seal which can seal the fluid-guiding space of the filter device relative to the environment. A holding function/connecting function of the connecting device and a sealing function between the fluid-guiding space of the filter device and the environment can thus be separated from each other. Accordingly, the holding function/connecting function and the sealing function each can be optimized, in particular independent of each other.

The object is solved furthermore with the filter device according to the invention in that the filter device comprises at least one exchangeable filter, in particular an exchangeable filter according to the invention, in particular a spin-on filter, comprising:
 a filter housing, in particular a housing cup, in which at least one filter element is arranged or can be arranged,
 a connecting member which is arranged at the end face of the filter housing and is provided with at least one fluid opening, in particular with at least one eccentric fluid opening and with a centrally arranged central opening,
 a filter-associated connecting part of a connecting device for detachably connecting the exchangeable filter with a filter head of the filter device,
 at least one filter-associated locking part of at least one locking device for releasably locking the connecting device,
wherein the filter-associated connecting part is detachably connectable with the filter head by means of a plug-in/rotary movement relative to a connecting axis, wherein the at least one filter-associated locking part automatically is releasably lockable by means of the plug-in/rotary movement with an appropriate head-associated locking part of the locking device, and wherein at least one filter-associated locking part comprises at least one filter-associated latching section of a latching connection for latching with a head-associated latching section of a head-associated locking part of the at least one locking device in a locked state and comprises at least one support section on the side of the filter-associated locking part that is facing away, radially relative to the connecting axis, from the at least one filter-associated latching section for supporting the at least one filter-associated locking part relative to at least one housing-associated circumferential section at least in radial direction at least in the locked state.

The at least one head-associated locking part can advantageously comprise a guide surface. The guide surface can ascend like a ramp in axial direction. At the end of the guide surface, optionally at least one head-associated latching section can be arranged. Upon rotational movement for closing the connecting device, at least one filter-associated latching section of at least one filter-associated locking part can be guided along the guide surface of the head-associated locking part.

The filter device, in particular the exchangeable filter, is suitable for filtration of fluid. In particular fluids, in particular oil or fuel, can be filtered therewith.

The filter device, in particular the exchangeable filter, can be used in internal combustion engines of motor vehicles. However, it can also be employed in different types of internal combustion engines, in particular industrial motors. The invention can also be utilized outside of internal combustion engines, in particular in automotive technology.

The filter head can advantageously comprise at least one inlet and/or at least one outlet for the fluid. The filter head can preferably be fixedly secured on a frame. The frame can be in particular part of the internal combustion engine and/or of the motor vehicle.

The connecting device can advantageously be connected and disconnected by means of a combined plug-in movement and rotary movement (plug-in/rotary movement) relative to a connecting axis. Combined plug-in/rotary connections can be closed and opened simply and quickly. Moreover, they are robust relative to tensile loads in the direction of the connecting axis. Accordingly, with the inventive connecting device, a quick-connect device can be realized in a simple way that can be easily and quickly closed and opened.

Advantageously, the connecting device can comprise at least one stop. By means of the at least one stop, it can be prevented that the connecting direction during the plug-in/rotary movement is moved past its closed position. In this way, the closed position can be precisely defined.

In other respects, the advantages and features that have been discussed above in connection with the exchangeable filter according to the invention and its advantageous embodiments apply likewise to the filter device of the invention and its advantageous embodiments, and vice versa.

The object is further solved with the filter head according to the invention in that the filter head comprises a head-associated connecting part with a connecting socket with which a filter-associated connecting part of an exchangeable filter can be detachably connected by means of a plug-in/rotary movement relative to a connecting axis of the filter device, wherein the head-associate connecting part comprises at least one fluid passage which can communicate with a fluid opening of the exchangeable filter, the filter head comprises at least one head-associated locking part of at least one locking device for releasable locking of the connection of the exchangeable filter with the filter head, and the filter head comprises at least one head-associated circumferential support section, in particular an outer seal section, for supporting at least one housing-associated circumferential section of the exchangeable filter, on which at least one filter-associated support section of at least one filter-associated locking part at least in radial direction relative to the connecting axis can be supported at least in the locked state.

In other respects, the advantages and features which have been explained above in connection with the exchangeable filter according to the invention and the filter device according to the invention and their respective advantageous embodiments apply likewise to the filter head according to the invention and its advantageous embodiments, and vice versa.

BRIEF DESCRIPTION OF THE DRAWINGS

Further advantages, features, and details of the invention result from the following description in which embodiments of the invention will be explained in more detail with the aid of the drawing. A person of skill in the art will consider the features, disclosed in combination in the drawing, the description, and the claims, also expediently individually and combine them to other meaningful combinations.

FIG. 2 shows an isometric illustration of the exchangeable filter of FIG. 1, showing the connecting side.

FIG. 3 is a plan view of the connecting side of the exchangeable filter of FIGS. 1 and 2.

FIG. 4 shows an isometric illustration of an exchangeable filter for the filter system of FIG. 1 with a locking device according to a second embodiment, showing the connecting side.

FIG. 5 shows an isometric illustration of the exchangeable filter of FIG. 4 with a partial section view of the filter head.

FIG. 8 shows an isometric illustration of an exchangeable filter with a locking device according to a fifth embodiment.

FIG. 9 shows an isometric illustration of the exchangeable filter of FIG. 8 with partial section view of the filter head.

In the Figs., same components are provided with same reference characters.

DESCRIPTION OF INVENTION

Figure 1:
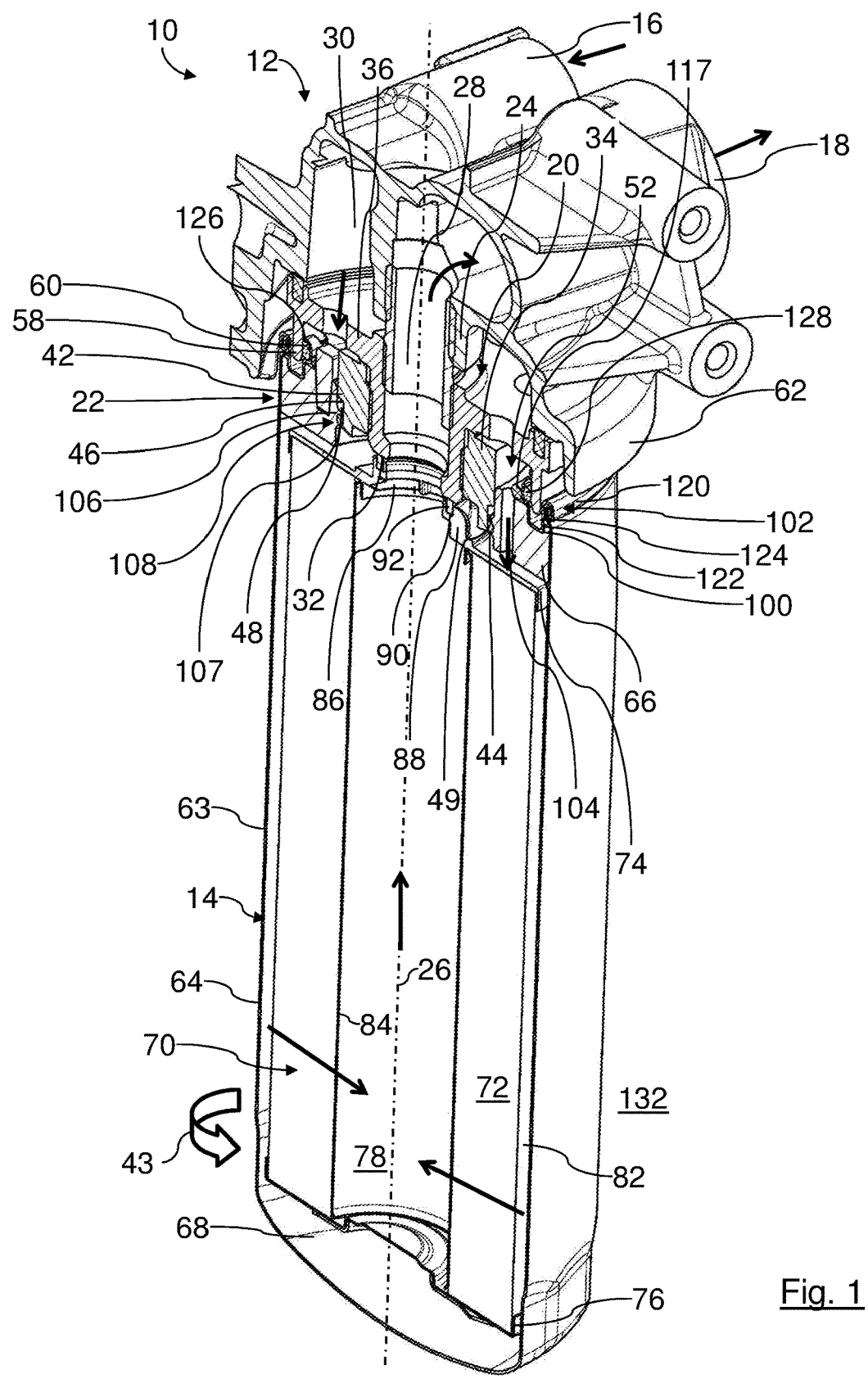
FIG. 1 shows a longitudinal section of a filter system for motor oil of an internal combustion engine of a motor vehicle with a filter head on which an exchangeable filter is attached by means of a detachable connecting device, wherein the connecting device is locked releasably by means of a locking device according to a first embodiment.

In FIGS. 1 to 3, a filter system 10 for motor oil of an internal combustion engine of a motor vehicle is illustrated in different perspective views, section views, and detail views.

The filter system 10 comprises a filter head 12 on which an exchangeable filter 14 according to a first embodiment is fastened detachably. The filter head 12 is made of metal. The filter head 12 is connected fixedly with the internal combustion engine and serves as a connecting part for the exchangeable filter 14. The filter head 12 comprises an inlet 16 and an outlet 18 for the motor oil. The inlet 16 and the outlet 18 are connected in a way not of interest in this context with the appropriate oil lines of the internal combustion engine.

Moreover, the filter head 12 comprises a head-associated connecting part 20 of a connecting device, as a whole referenced by 22, for connecting the exchangeable filter 14 with the filter head. The head-associated connecting part 20 is made of metal. The side of the head-associated connecting part 20 that is facing the exchangeable filter 14 has the shape and function of a connecting socket. The head-associated connecting part 20 is screwed into a hollow connecting cylinder 24 which is monolithically connected with the filter head 12. The connecting cylinder 24 comprises an inner thread. The connecting cylinder 24 is coaxial to a filter axis 26. The head-associated connecting part 20 instead of being a separate component that is screwed onto the filter head 12 can also be connected therewith to form a single piece.

When in the following "axial", "radial", "coaxial", "tangential" or "circumferential" is mentioned, this relates to the filter axis 26, if not indicated otherwise.

The head-associated connecting part 20 comprises a cylindrical connecting sleeve section 28 of a two-part configuration in axial direction provided with an outer thread which matches the inner thread of the connecting cylinder 24. When the exchangeable filter is installed, the connecting sleeve section 28 is also coaxial to the filter axis 26.

An interior of the connecting sleeve section 28 is connected with the outlet 18 of the filter head 12. At its radial inner circumferential side, the connecting sleeve section 28 has one step. The inner cross-section of the connecting sleeve section 28 is initially wide on the side which is facing the exchangeable filter 14 in order to then taper.

The connecting cylinder 24 is surrounded externally in radial direction by an annular inlet chamber 30 of the filter head 12.

An end face of the connecting sleeve section 28 facing the exchangeable filter 14 forms an annular coaxial sealing surface 32.

The connecting sleeve section 28 of the head-associated connecting part 20 is coaxially surrounded outwardly in radial direction by a round outer cylinder section 34. The outer cylinder section 34 is screwed onto the outer thread of the part of the connecting sleeve section 28 which is facing the exchangeable filter 14. A radial annular disk section 36 of the head-associated connecting part 20 is connected to the side which is facing away from the exchangeable filter 14 to the part of the connecting sleeve section 28 that is facing the exchangeable filter 14 so as to form a single piece.

On the radial outer circumferential side of the outer cylinder section 34, a total of three head-associated ramp sections 42 are arranged. The head-associated ramp sections 42 are identical in regard to the expansion and shape. The head-associated ramp sections 42 each extend relative to the filter axis 26 in a screw shape. A slope direction of the head-associated ramp sections 42 corresponds to a known right-hand thread.

A closing rotational direction 43 of the exchangeable filter 14 relative to the filter head 12, which is indicated in FIGS. 1 to 3 by an arrow, for closing the connecting device 22 corresponds to that of a known right-hand thread. Viewed from the exchangeable filter 14 toward the filter head 12 in axial direction, the closing rotational direction 43 extends clock-wise.

The head-associated ramp sections 42 each extend approximately across a circumferential angle of 240° The head-associated ramp sections 42 are arranged relative to each other in a staggered fashion. Two of the head-associated ramp sections 42, respectively, overlap across half of their circumferential expansion. The beginnings of the head-associated ramp sections 42 are located each on the free end face of the outer cylinder section 34 which is facing the exchangeable filter 14. The ends of the head-associated ramp sections 42 are circumferentially located where the head-associated ramp section 42 after next, viewed opposite to the closing rotational direction, is beginning.

Each head-associated ramp section 42 is comprised circumferentially of two areas. A first area with a respective insertion ramp surface 44 extends circumferentially from the beginning of each head-associated ramp section 42 up to the beginning of the head-associated ramp section 42 after next, viewed opposite to the closing rotation direction 43. The insertion ramp surfaces 44 are freely accessible in axial direction when viewed from the exchangeable filter 14. They extend respectively in radial direction and in screw-like fashion in circumferential direction. The insertion ramp surfaces 44 each extend in radial direction across the entire radial wall thickness of the outer cylinder section 34.

An area with a groove ramp surface 46 adjoins the respective insertion ramp surface 44, respectively. The circumferential extension of the insertion ramp surface 44 corresponds to the circumferential extension of the groove ramp surfaces 46. They extend each across a circumferential angle of 120°. The groove ramp surfaces 46 are located radially outside of the outer cylinder section 34. The areas with the groove ramp surfaces 46 each overlap with the ramp sections 42 which are following, viewed opposite to the closing rotational direction 43. In this context, the groove ramp surface 46 of the head-associated ramp section 42 that is leading when viewed in the closing rotational direction overlaps with the insertion ramp surface 44 of the following head-associated ramp section 42. The groove ramp surfaces 46 extend in radial direction approximately across half of the radial wall thickness of the outer cylinder section 34. The insertion ramp surfaces 44 pass without a step into the groove ramp surfaces 46. The groove ramp surfaces 46 have the same slope as the insertion ramp surfaces 44. The groove ramp surfaces 46 each begin in circumferential direction at the level of the beginning of the respective head-associated ramp sections 42 that are following in clock-wise direction. The groove ramp surfaces 46 end at the level of the beginning of the circumferential head-associated ramp section 42 after next, respectively.

The groove ramp surfaces 46 delimit a respective ramp groove 48 on an axial side. On the axially opposite side, the ramp grooves 48 each are delimited by a head-associated holding surface 49, axially opposite to the insertion ramp surface 42, of the corresponding area of the following head-associated ramp section 42. The ramp grooves 48 comprise a constant axial expansion in the circumferential direction. Viewed in circumferential direction, their radial expansion is also constant.

Figure 7:
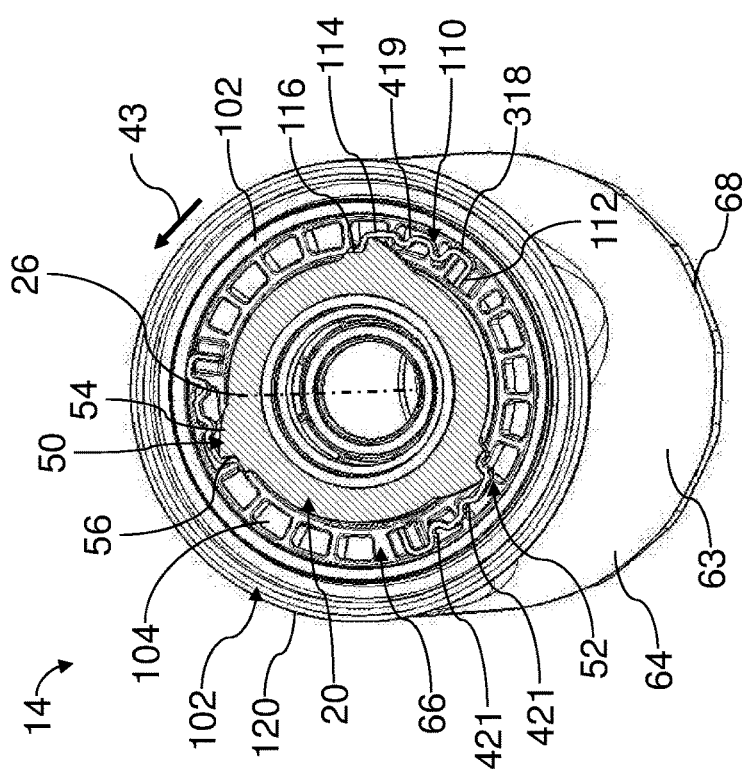
FIG. 7 shows an isometric illustration of an exchangeable filter with a locking device according to a fourth embodiment with a partial section view of the filter head.

Three head-associated latching elements 50 of a locking device, as a whole referred to by reference character 52, of the connecting device 22 are arranged on the radial outer circumferential side of the outer cylinder section 34. The latching elements 50 are shown in FIGS. 5, 7, and 9 in connection with further embodiments described infra. The latching elements 50 each are monolithic with the outer cylinder section 34. The latching elements 50 are radial projections. The latching elements 50, viewed in axial direction toward the filter head 12, are arranged in front of the radial annular disk section 36.

The latching elements 50 each are approximately wedge-shaped. In the rearward area relative to the closing rotational direction 43 of the connecting device 22, each latching element 50 comprises an ascending guide surface 54. The guide surface 54 is located on the radial outer circumferential side of the latching elements 50. A head-associated latching recess 56 adjoins the end of the guide surface 54. The radial expansion of the latching elements 50 is smaller, respectively, in the area of the latching recess 56 than in the area of the raised end of the guide surface 54 that is raised in radial direction. Each latching element 50 extends circumferentially about a circumferential angle of approximately 25° to 30°. The transition from the guide surface 54 to the appropriate locking recess 56 is located, viewed circumferentially, approximately at the same level as the end of the head-associated ramp sections 42 and the beginning of the corresponding head-associated ramp section 42 after next, viewed opposite to the closing rotational direction 43.

The connecting cylinder 24 and the head-associated connecting part 20 are surrounded by a head-associated circumferential support section in the form of a coaxial circular cylindrical outer sealing section 58. The free end face of the outer sealing section 58 is facing the exchangeable filter 14. Its inner cross-section increases toward its free end face. The radial inner circumferential side of the outer sealing section 58 forms an outer sealing surface 60.

Moreover, the filter head 12 comprises an outer collar 62 which sectionwise extends coaxially to the filter axis 26 and surrounds the outer sealing section 58 radially outwardly about a portion of the circumference.

The exchangeable filter 14 is designed as a spin-on filter with a round cross-section. It is substantially coaxial to the filter axis 26. The exchangeable filter 14 comprises a filter housing 63 with a filter cup 64 having a filter cover 66 fastened to its open side. The filter cup 64 has an outwardly curved filter bottom 68.

A coaxial filter element 70 is arranged in the filter cup 64. The filter element 70 comprises a zigzag-shaped folded circumferentially closed filter medium 72. At its end faces, the filter medium 72 is connected seal-tightly respectively with a connecting end disk 74, in FIG. 1 at the top, and a counter end disk 76, at the bottom.

The connecting end disk 74 is located on the side of the filter element 70 which is facing the filter cover 66. The filter medium 72 surrounds an element interior 78 of the filter element 70. The element interior 78 is located on a clean side of the filter element 70.

The counter end disk 76 closes off the element interior 78 at the end face of the filter element 70 which is facing the filter bottom 68. Several spring elements, which are hidden in the Figs., are supported on the outer side of the counter end disk 76 which is facing the filter bottom 68 and are supported, in turn, with the other end on the spring bottom 68.

The filter element 70 is radially outwardly surrounded by a raw-side annular chamber 82 which is delimited by the radial inner circumferential side of the filter cup 64.

In the element interior 78, a coaxial central tube 84 is extending between the counter end disk 76 and the connecting end disk 74. A circumferential wall of the central tube 84 is permeable to the motor oil. A radial inner circumferential side, i.e., radial inner fold edges, of the filter medium 72 is supported on the radial outer circumferential side of the central tube 84.

The connecting end disk 74 comprises a coaxial outlet opening 86 for the filtered motor oil. On the axial outer side of the connecting end disk, a coaxial seal-receiving cylinder 88 is monolithically provided. A radial inner circumferential side of the seal-receiving cylinder 88 is stepped. On the end face which is facing away from the element interior 78, the seal-receiving cylinder 88 comprises a coaxial sealing groove 90 with an annular inner seal 92. The inner seal 92, relative to the filter axis 26, is displaced axially relative to the filter-associated connecting part 108 toward the interior of the exchangeable filter 14. The inner seal 92 is designed as a flat seal. When the exchangeable filter 14 is mounted, the inner seal 92 with its side which is facing away from the element interior 78 is seal-tightly resting on the sealing surface 32 of the connecting sleeve section 28 of the head-associated connecting part 20. The inner seal 92 acts in axial radial direction. The inner seal 92 separates a raw side of the filter element 70, radially outside of the sealing receptacle 88, seal-tightly from a clean side, radially inside of the seal-receiving cylinder 88. The smallest inner radius of the seal-receiving cylinder 88 corresponds approximately to the inner radius of the connecting sleeve section 28 at its adjoining free end face.

Radially outside, the seal-receiving cylinder 88 is supported with the support elements 94, illustrated in FIGS. 2 and 3, against the radially extending section of the connecting end disk 74. The support elements 94 each extend radially and axially. Moreover, on the radial inner circumferential side of the seal-receiving cylinder 88 inner support elements are provided which support a ring section of the seal-receiving cylinder 88 that surrounds radially inwardly the sealing groove 90.

The filter cover 66 has the shape of a ring with an approximately rectangular profile. The filter cover 66 is made of plastic material. The filter cover 66 has the function of a connecting plate for connecting the exchangeable filter 14 with the filter head 12. The filter cover 66 comprises a receiving opening 98, which is shown, for example, in FIG. 2, and is coaxial to the filter axis 26 and is configured to receive the outer cylinder section 34 of the head-associated connecting part 20. Within the radial outer rim of the filter cover 66 on the outer side which is facing away from the filter bottom 68, a coaxial annular groove 100 is arranged for receiving a collar 122 of a sheet metal cover ring 102. Radially between the annular groove 100 and the receiving opening 98, a plurality of continuous inlet channels 104 is arranged. The inlet channels 104 extend each parallel to the filter axis 26. They connect the annular inlet chamber 30 of the filter head 12 with the interior of the filter cup 64, respectively, the raw-side annular chamber 82.

On the radial inner circumferential side of the filter cover 66, three filter-associated ramp sections 106 are arranged. The ramp sections 106 each realize connecting webs. The filter-associated ramp sections 106 each extend from the radial inner circumferential side of the filter cover 66 in radial inward direction. The filter-associated ramp sections 106 are substantially identical in their expansion and their circumferential extension. The sides of the filter-associated ramp sections 106 which are facing the interior of the filter cup 64 each form filter-associated holding surfaces 107. The sides of the filter-associated ramp sections 106 which are facing away from the interior of the filter cup 64 form respective filter-associated guide ramps. The filter-associated holding surfaces 107 and the guide ramps extend approximately parallel to each other. The filter-associated ramp sections 106 each extend in a screw-like fashion relative to the filter axis 26, in analogy to the head-associated ramp sections 42. Their slopes correspond to those of the head-associated ramp sections 42. The filter-associated ramp sections 106 extend each relative to the filter axis 26 across a circumferential angle of 120°. The filter-associated ramp sections 106 do not overlap each other. The beginnings 111 of the filter-associated ramp sections 106 are located on the side which is facing away from the interior of the filter cup 64 in axial direction. The beginnings 111 when the exchangeable filter 14 is mounted are facing the filter head 12. The beginnings 111 are spaced apart from a head-associated radial inner rim of the filter cover 66 which is facing away from the element interior 78 and surrounds the outlet opening 86. Viewed in circumferential direction, the beginning 111 of each filter-associated ramp section 106 is positioned at the same level as the end of the filter-associated ramp section 106 leading in the closing rotational direction 43. The axial heights of the filter-associated ramp sections 106 are circumferentially constant They correspond to the axial heights of the ramp grooves 48 of the head-associated ramp sections 42. The filter-associated ramp sections 106 and the receiving opening 98 form as a whole a filter-associated connecting part 108 of the connecting device 22.

On the outer side of the filter cover 66 which is facing away from the interior of the filter cup 64, three separate filter-associated latching spring elements 110 are arranged which are shown in FIGS. 2 and 3. The latching spring elements 110 are formed from spring sheet metal. The latching spring elements 110 are filter-associated locking parts of the locking device 52. The latching spring elements 110 comprise each a holding section 112. Radially between the annular groove 100 and the receiving opening 98, the holding sections 112 each are pressed into a corresponding one of inlet channels 104 of the filter cover 66 that serves as an insertion opening. Each holding section 112 has an axial overlap with the filter cover 66. The insertion openings of the inlet channels 104 have in an exemplary fashion a round cross-section. They can also be oval, or angular, or of a different shape.

Each spring arm section 114 of the latching spring element 110 is monolithic with the holding section 112. The spring arm sections 114 are located, viewed in the closing rotational direction 43, at the front side of the holding sections 112, respectively. The spring arms sections 114 extend circumferentially across a circumferential angle of approximately 30°. The spring arm sections 114 can be spring-elastically bent in radial direction outwardly at the holding sections 112. In longitudinal direction of the spring arm sections 114, i.e., in tangential direction or circumferential direction and in axial direction, the latching spring elements 110 are inflexible. The latching spring elements 110 are thus loadable relative to tensile forces or pressure forces in circumferential direction.

At their respective free ends which are facing away from the holding sections 112, the spring arm sections 114 each pass into a hook-shaped latching nose 116. The latching noses 116 extends radially inwardly. The latching noses 116 are located, viewed circumferentially, at the level of a beginning 111 of one of the filter-associated latching sections 106, respectively, and one of the ends of the respective preceding filter-associated ramp section 106.

Radially outwardly, the spring arm sections 114 are formed as support sections 118. With the support sections 118, the latching spring elements 110 are supported radially outwardly against a coaxial intermediate ring 117. The intermediate ring 117 surrounds the latching spring elements 110 continuously in circumferential direction. In the areas of the holding sections 112 of the latching spring elements 110, the intermediate ring 117 has a depression, respectively, at its radial inner circumferential side. The intermediate ring 117 is made of elastic material but it can also be rigid.

The sheet metal cover ring 102 comprises a profile with several bends. With its radial outer circumferential side it is connected by means of a crimp connection 120 fixedly with a free rim of the filter cup 64. Radially within the crimp connection 120, the sheet metal cover ring 102 has an approximately rectangular circumferentially continuously extending first bend section. In the area of the first bend section, the sheet metal cover ring 102 forms, on the side which is facing the filter cover 66, the collar 122 which engages the annular groove 100 of the filter cover 66.

On the exterior side of the sheet metal cover ring 102 which is facing away from the filter cover 66, the collar 122 provides a receiving groove 124 for the outer sealing section 58 of the filter head 12.

The radial inner circumferential side of the sheet metal cover ring 102 is bent to a U-shaped profile whose opening is pointing radially outwardly. The U-shaped profile comprises a coaxial circumferentially continuously extending sealing groove 126. An outer seal 128 is arranged in the sealing groove 126. The outer seal 128 is an O-ring seal. The outer seal 128 is radially outwardly oriented relative to the filter axis 26. The outer seal 128 acts in radial direction.

On its inner rim which is facing axially away from the filter cover 66, the sheet metal cover ring 102 can comprises in circumferential distribution a plurality of notches 130. In FIGS. 4 to 9, the sheet metal cover ring 102 is however of a closed configuration. The intermediate ring 117 is resting on the radial inner circumferential side of the sheet metal cover ring 102. The latching spring elements 110 are supported in this way by means of their support sections 118 indirectly by means of the intermediate ring 117 on the housing-associated inner circumferential side of the sheet metal cover ring 102 in radial outward direction. In this way, the radial elastic restoring force for deflections of the corresponding latching spring element 110 from an initial position into the locking position is increased. In this way, the holding force of the locking device 52 is increased.

When the exchangeable filter 14 is mounted, the outer seal 128 is resting seal-tightly on the outer sealing surface 60 of the outer sealing section 58. The outer seal 128 separates the raw side of the filter element 70, respectively, the annular inlet space 30, from the environment 132.

For connecting to the filter head 12, the exchangeable filter 14, with the filter cover 66 leading, is first moved axially relative to the connecting axis, which in the embodiment coincides with the filter axis 26, in a plug-in movement toward the head-associated connecting part 20 of the filter head 12. The exterior cylinder section 34 is inserted into the receiving opening 98 of the filter cover 66 to such an extent that the filter-associated ramp sections 106 impact axially on the insertion ramp surfaces 44 of the head-associated ramp sections 42. The outer sealing section 58 is located axially remote from the outer seal 128.

With a rotational movement of the exchangeable filter 14 in closing rotation direction 43, the filter-associated connecting part 108 is screwed into the head-associated connecting part 20. In this context, the filter-associated ramp sections 106 each engage each one of the ramp grooves 48. After completion of a rotational angle of 60° from beginning of immersion of the filter-associated ramp section 106 into the ramp grooves 48, the outer seal 128 begins to contact the outer sealing surface 60 of the outer sealing section 58 and is guided by the inlet area with widened cross-section upon further rotation of the exchangeable filter 14.

After a further rotation by 60°, the ends of the filter-associated ramp sections 106 leading in the closing rotational direction 43 impact on the rearward ends of the ramp grooves 48. The ends of the ramp grooves 48 form stops with which, in the closed state of the connecting device 22, a further rotation of the exchangeable filter 14 is prevented.

In the closed state of the connecting device 22, the inner seal 92 is resting seal-tightly and compressed in axial direction on the sealing surface 32 of the connecting sleeve section 28.

In an end phase of the closing movement, the latching noses 116 of the spring arm sections 114 of the latching spring elements 110 each impact on the ends of the guide surfaces 54 of the latching elements 50 that are to the rear in the closing rotation direction 43. Upon further rotation of the exchangeable filter 14 in the closing rotational direction 43, the latching noses 116 are guided on the guide surfaces 54. The spring arm sections 114 with the latching noses 116 in this context are elastically forced in radial outward direction. In this context, the support sections 118 are supported on the intermediate ring 117 in radial direction. The intermediate ring 117, in turn, is supported in radial direction by means of the radial inner circumferential section of the sheet metal cover ring 102 with intermediate positioning of the outer seal 128 against the head-associated outer sealing section 58. In the closed state of the connecting device 22, the filter-associated latching noses 116 each latch in the latching recesses 56 of the head-associated latching elements 50 and form a latching connection. Upon latching of the latching noses 116, a detectable noise is generated.

The latched latching noses 116 make difficult opening of the connecting device 22 by rotation of the exchangeable filter 14 opposite to the closing rotation direction 43. The locked locking device 52 is loadable relative to tensile forces in the opening rotational direction. Moreover, the compressed inner seal 92, as a result of friction, makes it difficult to open the connecting device 22.

Removal of the exchangeable filter 14 from the filter head 12 is realized by rotation of the exchangeable filter 14 opposite to the closing rotation direction 43. In this context, first the spring force of the spring sections 114, the support force of the support sections 118, and the friction force between the inner seal 92 and the sealing surface 32 must be overcome. For this purpose, an increased opening torque must be applied.

Upon operation of the filter system 10, the motor oil to be filtered is supplied through inlet 16 of the filter head 12 to the annular inlet chamber 30. From here, the motor oil flows through the inlet channels 104 into the raw-side annular space 82 of the exchangeable filter 14. The motor oil to be filtered flows through the filter medium 72 in radial direction from the exterior to the interior and is purified. The purified motor oil exits the element interior 78 through the outlet opening 86 and reaches the interior of the connecting sleeve section 28 which serves as an oil passage. The interior of the connecting sleeve section 28 communicates thus fluidically with the outlet opening 86. From here the purified motor oil flows into the outlet 18 of the filter head 12 and exits the filter system 10.

In FIGS. 4 and 5, a second embodiment of an exchangeable filter 14 is illustrated. FIG. 5 shows in this context the exchangeable filter 14 with partial section view of the head-associated connecting part 20. Those elements that are similar to those of the first embodiment in FIGS. 1 to 3 are identified with identical reference characters.

The second embodiment differs from the first embodiment in that the latching spring elements 110 each comprise a support section 218 in the form of a support arm. The support sections 218 are located on the exterior side of the corresponding latching spring element 110 which is radially opposite to the latching noses 116 relative to the filter axis 26. The support sections 218 each are monolithic with the spring arm section 114. The support sections 218 are oriented away from the spring arm section 114 at a slant in radial direction outwardly and opposite to the closing rotation direction 43.

With their free ends, the support sections 218 are supported, in analogy to the first embodiment, on the radial inner circumferential side of the intermediate ring 117.

In the second embodiment the notches on the inner rim of the sheet metal cover ring 102 are eliminated.

Figure 6:
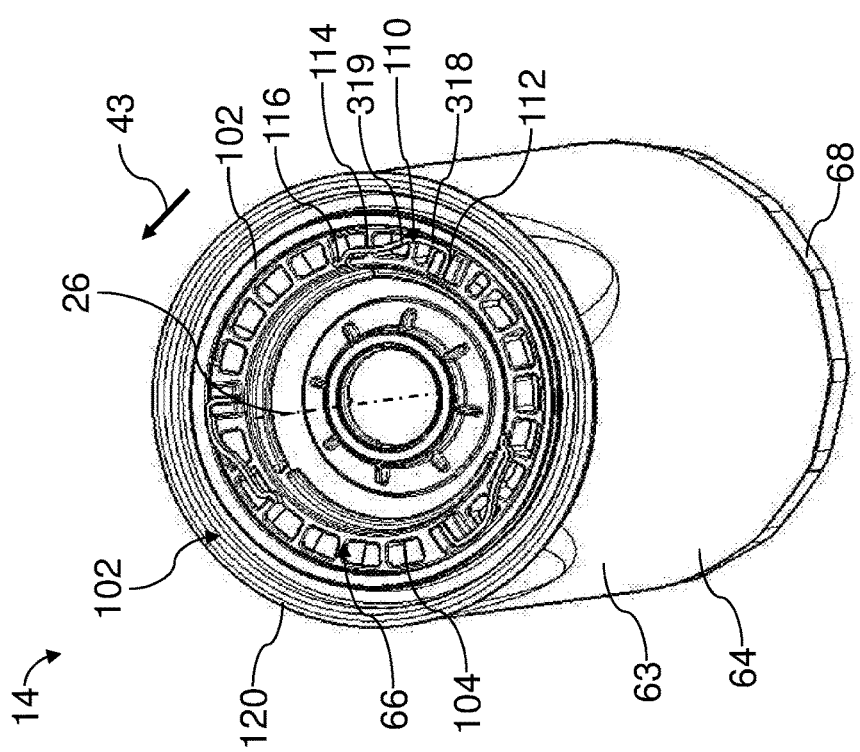
FIG. 6 shows an isometric illustration of an exchangeable filter with a locking device according to a third embodiment.

In FIG. 6, a third embodiment of an exchangeable filter 14 is illustrated. Those elements that are similar to those of the second embodiment of FIGS. 4 and 5 are provided with the same reference characters.

The third embodiment differs from the second embodiment in that support sections 318 of the latching spring elements 110 in the form of projections are arranged approximately opposite the respective holding sections 112. The support sections 318, like the support sections 118 and 218 of the first two embodiments, have the task to elastically support the filter-associated locking parts 108 in radial outward direction against the intermediate ring 117.

Moreover, the spring arms sections 114 of the latching spring elements 110 each are provided with a profiling 319. The spring arm sections 114 for this purpose are bent approximately S-shaped in radial direction inwardly. With the profilings 319 the stability of the latching spring elements 110 is improved so that greater forces can be transmitted.

In FIG. 7, a fourth embodiment of an exchangeable filter 14 is illustrated. Those elements that are similar to those of the third embodiment of FIG. 6 are provided with the same reference characters.

The fourth embodiment differs from the third embodiment in that the spring arm sections 114 of the latching spring elements 110 each are provided with a somewhat more complex profiling 419. The spring arm sections 114 are for this purpose provided with multiple bends and each have, viewed in axial direction, two approximately U-shaped grooves 421. With the grooves 421 the stability of the latching spring elements 110 is further improved so that greater forces can be transmitted.

In FIGS. 8 and 9, a fifth embodiment of an exchangeable filter 14 is illustrated. Those elements that are similar to those of the first embodiment of FIGS. 1 to 3 are provided with the same reference characters.

The fifth embodiment differs from the first embodiment in that the latching spring elements 110 are monolithically formed from a circumferentially continuous sheet metal ring 523. The sheet metal ring 523 is connected by means of three holding tabs 512 with the filter cover 66. The holding tabs 512 are distributed in accordance with the holding sections 112 of the first embodiment circumferentially and are assigned to one of the spring arm sections 114, respectively. The holding tabs 512 are inserted in respective insertion openings of the inlet channels 104 which are here approximately rectangular in an exemplary fashion.

The spring arm sections 114 each comprise a support section 518 for support against the intermediate ring 117. The support sections 518 each extend, viewed in circumferential direction, on opposite sides before and behind the holding tabs 512. Viewed in the closing rotational direction 43, in front of each holding tab 512 the respective support section 518 extends to approximately the level of the latching nose 116 of the preceding latching spring element 110. Behind each holding tab 512, the respective support section 518 extend in the direction toward the latching nose 116 of the corresponding latching spring element 110 approximately across one third of the length of the corresponding spring arm section 114.

While specific embodiments of the invention have been shown and described in detail to illustrate the inventive principles, it will be understood that the invention may be embodied otherwise without departing from such principles.

What is claimed is:

1. An exchangeable filter comprising:
a filter element of a filter medium encircling a filter axis extending through an open interior of the filter element, the filter element comprising:
a connecting end disk, secured onto a first axial end of the filter medium, wherein the connecting end disk has a coaxial outlet opening extending through the connecting end disk and into the open interior;
the connecting end disk having:
a tubular receiving cylinder having an open interior, the tubular receiving cylinder having a first end secured onto an axially outer surface of the connecting end disk at the coaxial outlet opening such that the coaxial outlet opening continues through the tubular receiving cylinder;
a plurality of radially extending support ribs arranged on a radially outer surface of the tubular receiving cylinder, the radially extending support ribs arranged on the axially outer surface of the connecting end disk, supporting the tubular receiving cylinder;

wherein an axial direction, as used herein, is a direction parallel to the filter axis;
wherein a radial direction, as used herein, is a direction traverse to the filter axis;
a filter housing comprising:
  a filter cup having a circumferentially close outer wall, a closed bottom and an open axial end;
  wherein the filter element is arranged within the filter cup;
  a filter cover secured onto the filter cup at the open axial end of the filter cup, enclosing the filter element in the filter cup, the filter cover comprising:
    a receiving opening arranged coaxial to the tubular receiving cylinder and having a larger diameter than the tubular receiving cylinder;
    a plurality of inlet channel openings extending through the filter cover, spaced radially outwardly away from and surrounding the receiving opening;
    a plurality of screw-shaped ramp sections arranged on an inner circumference of the receiving opening and extending radially inwardly towards the tubular receiving cylinder, the plurality of ramps spaced apart in a circumferential direction such that each of the plurality of screw-shaped ramp sections extend about different portions of the inner circumference of the receiving opening;
  a plurality of latching spring elements secured onto the filter cover and spaced radially outwardly from the receiving opening, the plurality of latching spring elements comprising:
    a circumferentially extending spring arm forming a support section, the circumferentially extending spring arm forming an arc section about the filter axis;
    a holding section arranged at a first circumferential end of the latching spring element, the hold section secured onto the filter cover;
    a latching nose arranged on a second circumferential end of the latching spring elements;
wherein the plurality of latching spring elements are configured to latch with a latching section of a filter head in an installed and locked state of the exchangeable filter element on the filter head;
wherein the plurality of latching spring elements are configured to automatically and releasably lock by the plug-in/rotary movement with the latching section of the filter head.

2. The exchangeable filter according to claim 1, wherein the plurality of latching spring elements is elastic at least in the radial direction.

3. The exchangeable filter according to claim 1, further comprising
an intermediate ring arranged on the filter cover (66) and circumferentially surrounding a radially outer side of the plurality of latching spring elements.

4. The exchangeable filter according to claim 3, wherein the intermediate ring is elastic or rigid.

5. The exchangeable filter according to claim 1, wherein the plurality of latching spring elements is at least partially elastic at least in the radial direction.

6. The exchangeable filter according to claim 1, wherein the plurality of latching spring elements is a separate part that is connected directly with the filter cover;
wherein the holding section of the plurality of latching spring elements is received through though a respective inlet channel opening of the filter cover, mounting the plurality of latching spring elements to the filter cover.

7. The exchangeable filter according to claim 1, wherein at least two of the plurality of latching spring elements are interconnected with each other and are connected indirectly or directly with the filter cover.

8. The exchangeable filter according to claim 7, wherein the plurality of latching spring elements are interconnected to form a single piece.

9. The exchangeable filter according to claim 1, wherein the latching nose comprises a hook section.

10. The exchangeable filter according to claim 1, wherein the latching nose is elastically movable.

11. The exchangeable filter according to claim 1, wherein the circumferentially extending spring arm includes a plurality of grooves or bends formed into the circumferentially extending spring arm.

12. A filter device for fluid comprising:
an exchangeable filter, according to claim 1;
a filter head comprising:
  a connecting socket having an outer cylinder section;
  wherein the connecting socket is configured to detachably connect with a exchangeable filter by a plug-in/rotary movement relative to a connecting axis of the filter device;
  a plurality of wedge shaped latching elements formed as radial projections on a radially outer surface of the outer cylinder section, the plurality of wedge shaped latching elements configured to engage and lock with the respective one of the plurality of latching spring elements in the installed and locked state of the exchangeable filter element on the filter head.

* * * * *